(12) United States Patent
Sugiyama et al.

(10) Patent No.: US 6,292,733 B1
(45) Date of Patent: Sep. 18, 2001

(54) VEHICULAR BRAKE CONTROLLING APPARATUS

(75) Inventors: Yoshitaka Sugiyama, Kanagawa; Toru Kojima, Kanagawa, both of (JP)

(73) Assignees: Unisia Jecs Corporation, Atsugi; Nissan Motor Co., Ltd., Yokohama, both of (JP)

( * ) Notice: Subject to any disclaimer, the term of this patent is extended or adjusted under 35 U.S.C. 154(b) by 0 days.

(21) Appl. No.: 09/400,910

(22) Filed: Sep. 22, 1999

(30) Foreign Application Priority Data

Sep. 22, 1998 (JP) .................................................. 10-268481

(51) Int. Cl.$^7$ ...................................................... B60T 8/62
(52) U.S. Cl. ................................. 701/76; 701/75; 701/92; 303/122.05
(58) Field of Search .................................. 701/71, 72, 74, 701/75, 76, 92; 303/122, 122.02, 122.04, 122.05; 180/197

(56) References Cited

U.S. PATENT DOCUMENTS

| | | | |
|---|---|---|---|
| 4,669,046 | * | 5/1987 | Kubo ..................................... 701/76 |
| 5,138,556 | * | 8/1992 | Yoshino ................................. 701/76 |
| 5,303,988 | * | 4/1994 | Okubo .................................... 701/74 |
| 5,749,062 | * | 5/1998 | Yamamoto et al. .................... 701/75 |
| 5,795,039 | | 8/1998 | Fennel et al. .................... 303/122.05 |
| 5,922,038 | * | 7/1999 | Horiuchi et al. ....................... 701/76 |
| 6,026,343 | * | 2/2000 | Ogino .................................... 701/75 |

FOREIGN PATENT DOCUMENTS

| | | |
|---|---|---|
| 44 14 980 | 11/1995 | (DE) . |
| 5-278585 | 10/1993 | (JP) . |
| 6-211116 | 8/1994 | (JP) . |

* cited by examiner

Primary Examiner—Gary Chin
(74) Attorney, Agent, or Firm—Foley & Lardner

(57) ABSTRACT

A vehicular brake controlling apparatus comprises: a brake unit to enable a suppression of boosting a braking liquid pressure independently of each wheel cylinder, each wheel cylinder operatively braking a corresponding one of vehicular front and rear road wheels according to the braking liquid pressure; a plurality of road wheel velocity sensors, each road wheel velocity sensor detecting a revolution velocity of the corresponding one of the road wheels and outputting a signal indicating the detected road wheel revolution velocity thereof; and a controller configured to be enabled to execute such a braking force distribution control function as to controllably operate the brake unit to suppress the boosting in the braking liquid pressure for the rear road wheels on the basis of a revolution velocity difference between the front and rear road wheels derived from the signals outputted from the respective road wheel velocity sensors when the revolution velocity difference is in excess of a predetermined start threshold value and to be enabled to execute a back-up control function for the braking force distribution control function on the basis of the signals outputted from the other road wheel velocity sensors which are operated normally when detecting an occurrence of failure in any one of the road wheel velocity sensors, the controller being configured to modify the predetermined start threshold value from a value used during the execution of the braking force distribution control function with all of the road wheel velocity sensors operated normally when executing the back-up control function.

20 Claims, 13 Drawing Sheets

VEHICULAR BRAKE CONTROLLING APPARATUS

BACKGROUND OF THE INVENTION a) Field of the Invention

The present invention relates to vehicular brake controlling apparatus in which a braking liquid pressure for rear road wheels is executed to prevent a lock of the rear road wheel(s) earlier than front road wheel(s) during a braking operation of the vehicle.

b) Description of the Related Art

Since a wheel load of each front road wheel(s) is Increased whereas that of each rear road wheel(s) is decreased during a vehicular braking, there is a strong tendency of the rear road wheel(s) as compared with the case of the front road wheel(s). Hence, if the rear road wheel(s) should be locked at an earlier time than the front road wheel(s), a vehicular behavior would become unstable.

In order to equalize the lock tendencies between the rear and front road wheels, it is known that the braking force is acted upon the front and rear road wheels in accordance with an ideal braking force distribution. Hence, in general, a proportioning valve is interposed in a braking conduit to raise the braking liquid pressure for the front and rear road wheels on the basis of the ideal braking force distribution.

Recently, various types of vehicular anti-skid (or anti-lock) brake control systems (so-called, ABS) to prevent the vehicular road wheel locks from occurring have been mounted in many automotive vehicles.

A Japanese Patent Application First Publication No. Heisei 5-278585 exemplifies one of the anti-lock brake control systems using a brake unit capable of executing the ABS control to achieve the same function as the proportioning valve. The Japanese Patent Application First Publication identified above teaches a braking force distribution control such that when the revolution velocity of the rear road wheel(s) is slower than that of the front road wheel(s), a rear-road-wheel brake actuator is activated to suppress a boosting of a braking liquid pressure for the rear road wheel(s) such as a pressure decrease or hold of a pressure and, when the revolution velocity of the front road wheel(s) is faster than that of the rear road wheel(s), the rear-road-wheel brake actuator is activated to recover the brake liquid pressure.

On the other hand, the brake controlling apparatus in which the braking force distribution control using the brake unit is executed has been proposed in which a predetermined back-up control is executed when a failure in the brake controlling apparatus occurs. For example, the execution of the braking force distribution control is inhibited during a detection of the failure (refer to a Japanese Patent Application First Publication No. Heisei 6-211116 published on Aug. 2, 1994).

Furthermore, a German Patent Application First Publication No. DE-A1 44 14 980 published on Nov. 2, 1995 exemplifies another previously proposed vehicular brake controlling apparatus in which the braking force distribution control is continued on the basis of any signals derived from vehicular road wheel revolution velocity sensors which function normally when the failure of any one of the road wheel revolution velocity sensors occurs and a left-and-right road wheel synchronous control is advanced when executing the braking force distribution control for the rear road wheels in the case where either of the rear road wheel revolution velocity sensors has failed.

SUMMARY OF THE INVENTION

However, if the failure occurs in any one of the road wheel velocity sensors and the left-and-right-road-wheel synchronous control is executed or the braking force distribution control using the normally functioning road wheel sensors is continued, the following problems occur.

First, in a case where the back-up control executing the left-and-right road wheel synchronous control with one of the rear road wheel revolution velocity sensors failed, the following problems occur when the brake operation is carried out during a turn of the vehicle.

a) A case where the failed road wheel velocity sensor is positioned at an inner wheel with respect to a turning direction.

The road wheel velocity of the inside road wheel with respect to the turning direction becomes lower than that of an outer wheel with respect to the turning direction.

In a case where the braking force distribution of the rear two road wheels in the left-and-right road wheel synchronous control mode are carried out on the basis of the road wheel revolution velocity sensors which is located on one of the rear road wheels which is outside with respect to the turning direction, a controller determines that a more braking force should be applied (an insufficient braking force) to the outside wheel since the wheel load on the outside wheel is large, the revolution velocity is high, and a large braking force can be applied. At this time, since the inside road wheel with respect to the turning direction is also determined to have the insufficient braking force, the incremental pressure control of the braking liquid pressure is carried out.

However, since the wheel load on the road wheel during the turning is lower than the outside road wheel during the turning, the lock tendency of the inner road wheel becomes stronger so that a running stability of the vehicle becomes deteriorated.

b) A case where the failed road wheel revolution velocity sensor is located on the outside road wheel during the turning.

Since, in this case, the road wheel velocity of the outside road wheel during the turning becomes higher than the inner wheel during the turning, the rear two road wheels are synchronously controlled as the left-and-right road wheels on the basis of the normally functioning road wheel velocity sensor on the inside wheel during the turning, the lock tendency of the inside wheel during the braking becomes high since the weight load of the inside wheel is lower and the revolution velocity of the inside wheel is low. If the inside wheel is determined to have an excessive braking force, the outside wheel is also determined to have the excessive braking force, the pressure decrease control of the braking liquid pressure is carried out. Consequently, the insufficient braking liquid pressure of the outside wheel is resulted and the braking distance of the vehicle becomes long.

Next, in a case where the back-up control is advanced in which the braking force distribution control is continued with the road wheel revolution velocities of the front left and right road wheels determined on the basis of a detected value of one of the front left and right road wheel revolution velocity sensors when the other of the front left and right road wheel velocity sensors has failed, the following problem occurs.

Especially, in a case where the failed road wheel velocity sensor is located on the outside wheel, the revolution velocity of the front road wheel is determined on the basis of the road wheel velocity of the inside wheel which is lower than the outside wheel.

The lock-up control of the braking force distribution control is executed on the basis of the difference between the road wheel velocities of the inside wheel of the front left and right road wheels during the turning and of the rear left and right road wheels. At this time, the start threshold value of the rear road wheels is set to a lower value so that a start of the pressure decrease control for the rear road wheels may be delayed. In this case, the lock tendencies of the rear left and right road wheels become strong and the running stability of the vehicle becomes deteriorated.

It is therefore an object of the present invention to provide an improved vehicular brake controlling apparatus which prevents an increase in the lock tendencies of the rear road wheels due to an excessive braking force so as to prevent a deterioration of the vehicular running stability and prevent the increase in the braking distance due to the insufficient braking force even when one of the vehicular road wheel velocity sensors has failed and the back-up control is executed during the turn of the vehicle in which the braking force distribution control is continued on the basis of the detected values of the remaining normally functioning (operated) road wheel velocity sensors.

The above-described object can be achieved by providing a vehicular brake controlling apparatus comprising: a brake unit to enable a suppression of boosting a braking liquid pressure independently of each wheel cylinder, each wheel cylinder operatively braking a corresponding one of vehicular front and rear road wheels according to the braking liquid pressure; a plurality of road wheel velocity sensors, each road wheel velocity sensor detecting a revolution velocity of the corresponding one of the road wheels and outputting a signal indicating the detected road wheel revolution velocity thereof; and a controller configured to be enabled to execute such a braking force distribution control function as to controllably operate the brake unit to suppress the boosting in the braking liquid pressure for the rear road wheels on the basis of a revolution velocity difference between the front and rear road wheels derived from the signals outputted from the respective road wheel velocity sensors when the revolution velocity difference is in excess of a predetermined start threshold value and to be enabled to execute a back-up control function for the braking force distribution control function on the basis of the signals outputted from the other road wheel velocity sensors which are operated normally when detecting an occurrence of failure in any one of the road wheel velocity sensors, the controller being configured to modify the predetermined start threshold value from a value used during the execution of the braking force distribution control function with all of the road wheel velocity sensors operated normally when executing the back-up control function.

According to the present invention, during a normal operation state such that all of the front right and left and the rear right and left road wheel velocity sensors are normally operated and during the braking operation, the controller derives the revolution velocity difference between one of the front road wheels and one of the rear road wheels on the basis of each road wheel velocity indicating signal outputted from the road wheel velocity sensors and operates the brake unit to suppress the boosting of the braking liquid pressure for each rear road wheel when the revolution velocity difference is in excess of the predetermined start threshold value. Hence, the vehicular braking controlling apparatus can prevent the vehicular running stability with each rear road wheel being locked at an earlier time than the lock on each front road wheel from being deteriorated.

If any one of the front right and left and the rear right and left road wheel velocity sensors has failed, the controller executes the back-up control function which continues the braking force distribution control function on the basis of the road wheel velocity signals outputted from the remaining normally operated road wheel velocity sensors. During the back-up control function, the predetermined start threshold value is modified from the value which is used during all of the sensors being normally operated. This modification causes a modification of the revolution velocity difference between the front and rear road wheels when the suppression of boosting in the braking liquid pressure for each rear road wheel caused by the braking force distribution control function is started. That is to say, this modification can make the boosting suppression easier to be executed or difficult to be executed depending on the vehicular running situation. Hence, it is possible for the vehicular brake controlling apparatus according to the present invention to prevent the increase in the lock tendency of each rear road wheel due to the excessive braking force from occurring by making the brake controlling apparatus easier to execute the boosting suppression according to the vehicular running state and to prevent the increase in the braking distance due to the insufficient braking force from occurring by making the brake controlling apparatus difficult to execute the boosting suppression according to the vehicular running state.

DETAILED DESCRIPTION OF THE PREFERRED EMBODIMENT

Reference will hereinafter be made to the drawings in order to facilitate a better understanding of the present invention.

(First Embodiment)

Figure 1:
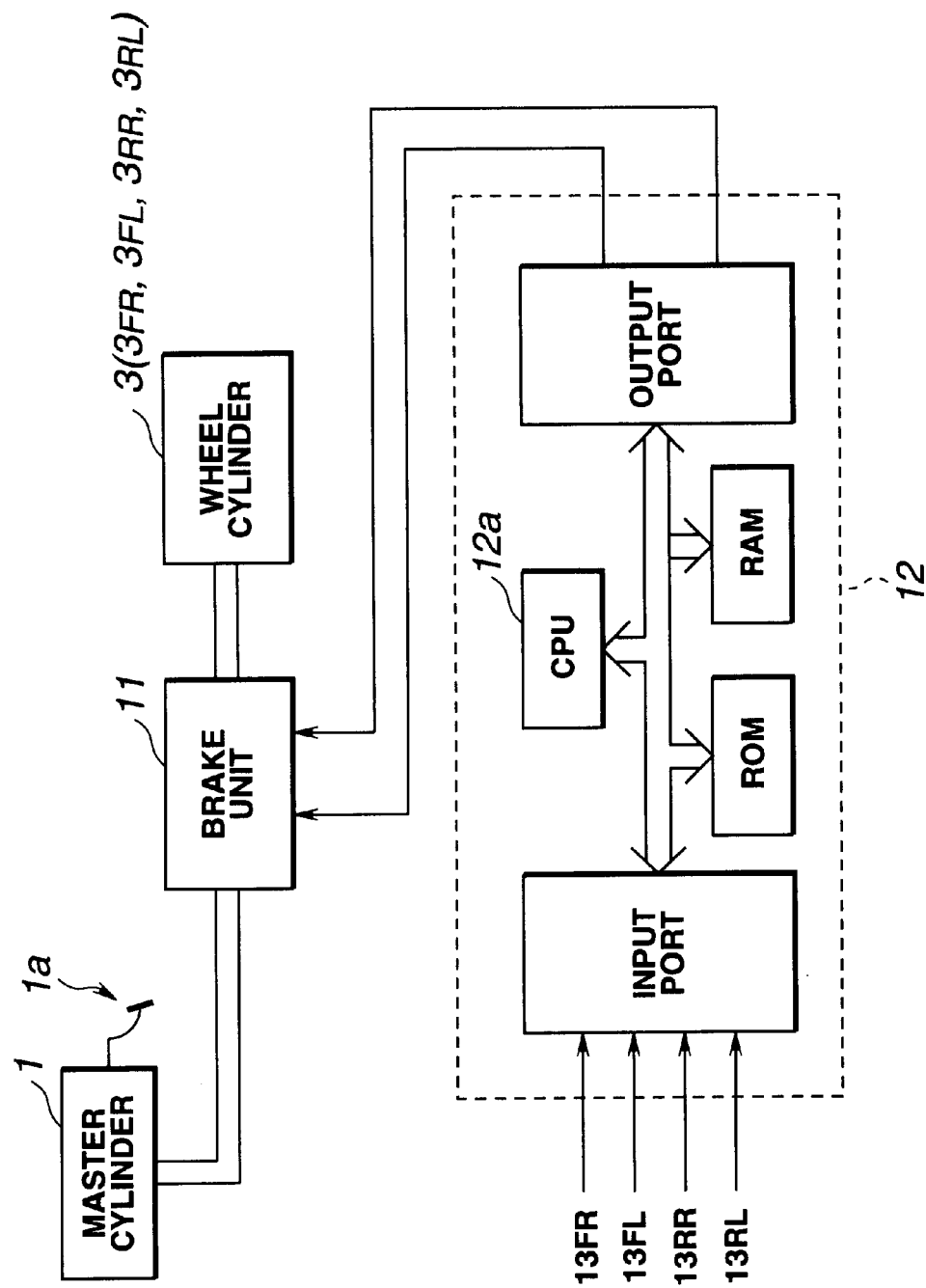
FIG. 1 is a circuit block diagram of a vehicular brake controlling apparatus in a first preferred embodiment according to the present invention.

FIG. 1 shows a general concept of a vehicular brake controlling apparatus in a first preferred embodiment according to the present invention.

In FIG. 1, a master cylinder 1 is constructed to develop a brake liquid pressure through a depression of a brake pedal 1a by a vehicular driver. A brake unit 11 is interposed between a representative wheel cylinder 3 and the master cylinder 1.

A controller 12 receives each signal derived from a plurality of vehicular road wheel revolution sensors 13FR, 13FL, 13RR, and 13RL and outputs control signals to the brake unit 11.

Figure 2:
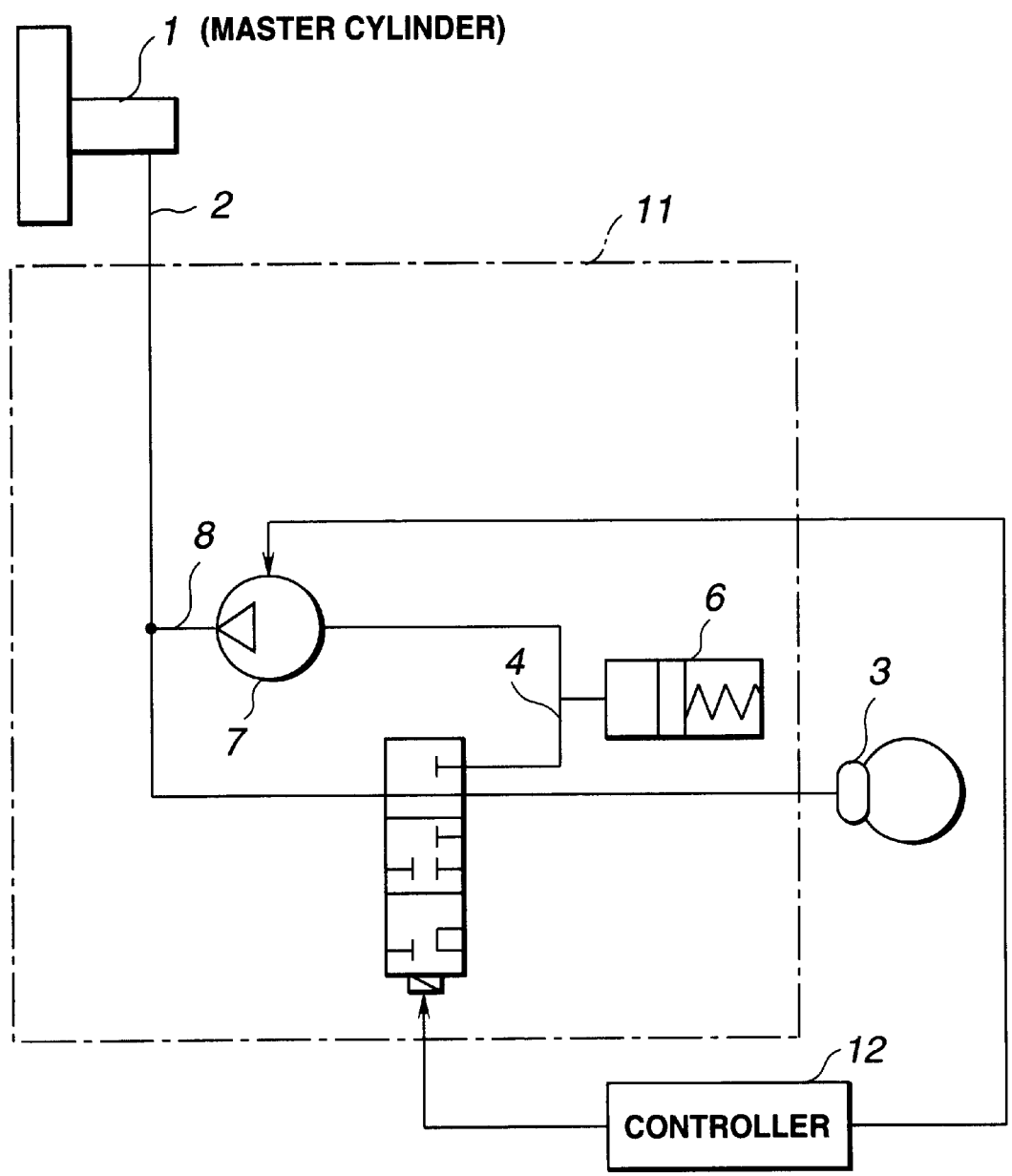
FIG. 2 is a hydraulic circuit block diagram representing a brake unit and its peripheral circuit shown in FIG. 1.
Figure 3:
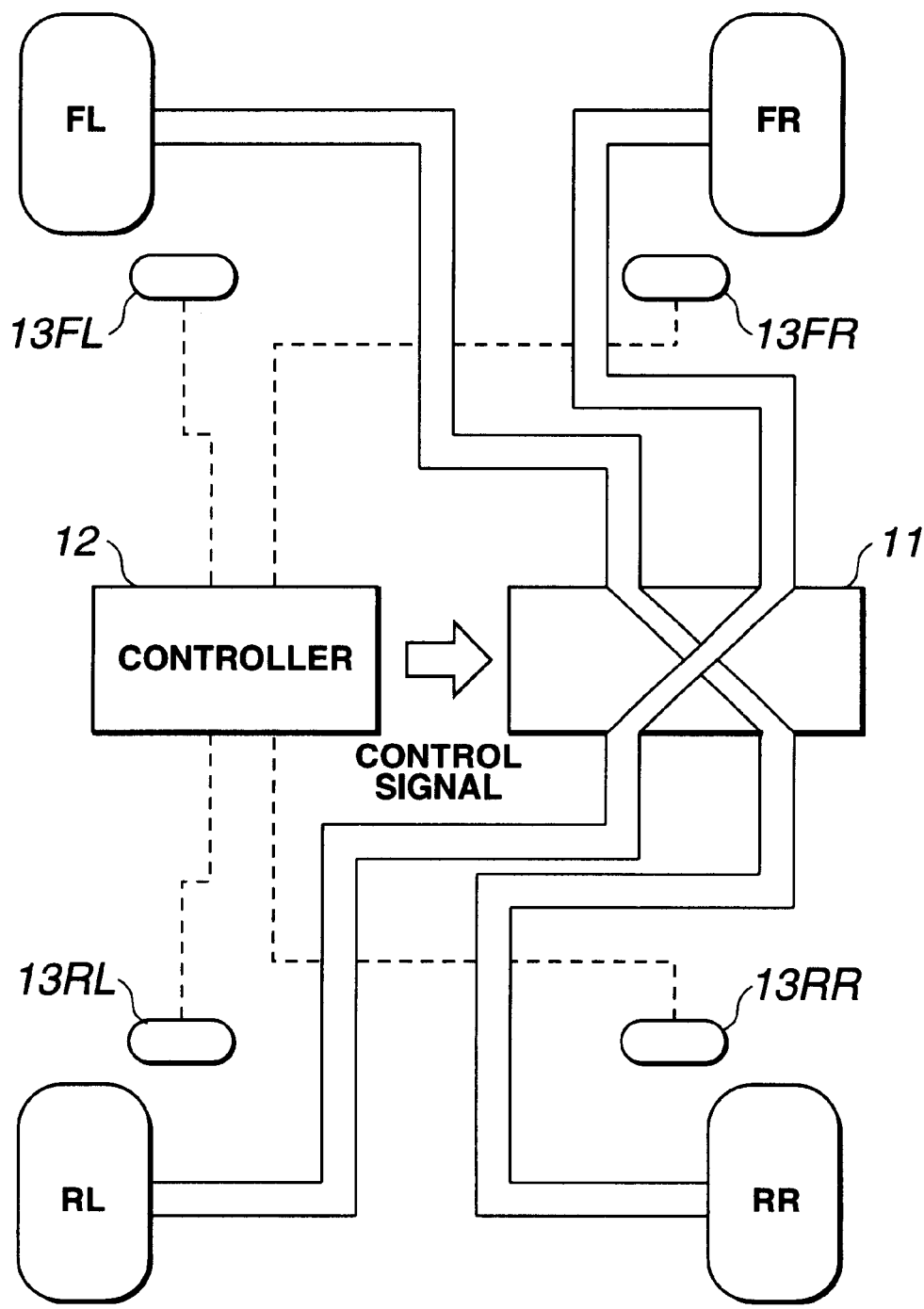
FIG. 3 is a whole electric and hydraulic circuit block diagram of the vehicular brake controlling apparatus shown in FIG. 2.

FIG. 2 shows an internal hydraulic circuit of the brake unit 11.

The master cylinder 1 is connected to the representative wheel cylinder 3 via a brake circuit 2.

A three-way switching valve 5 is interposed in a midway through the brake circuit 2 to be enabled to switch states of hydraulic pressures as a pressure increase condition in which an upstream side (master cylinder) of the brake circuit 2 is communicated with a downstream side (wheel cylinder 3) thereof; a pressure decrease condition in which a brake liquid in the downstream side (wheel cylinder 3) thereof is drained (discharged) to a drain circuit 4; and a pressure hold condition in which the brake circuit 2 is interrupted to hold a braking liquid pressure of the representative wheel cylinder 3. Hence, the brake liquid pressure in the representative wheel cylinder 3 is arbitrarily controllable on the basis of the switching of the switching valve 5.

A reservoir (reserve tank) 6 is interposed so as to enable a reserve of the brake liquid.

A circulation circuit 8 is disposed to connect the reservoir 6 to a position located upstream with respect to the switching valve 5 and a pump 7 to circulate the brake liquid reserved into the reservoir 6 to the brake circuit 2.

It is noted that although FIG. 2 explains the internal circuit structure for a representative road wheel, the brake unit 11 is structured so as to be enabled to control respective brake liquid pressures of a plurality of wheel cylinders 13FR, 13FL, 13RL, and 13RR on front right road wheel FR, front left road wheel FL, rear right road wheel RR, and the rear left road wheel RL.

The controller 12 controls the operations of the switching valve 5 and a pump 7 of the brake unit 11.

Next, a brake control executed in the controller 12 will be described below.

Figure 4:
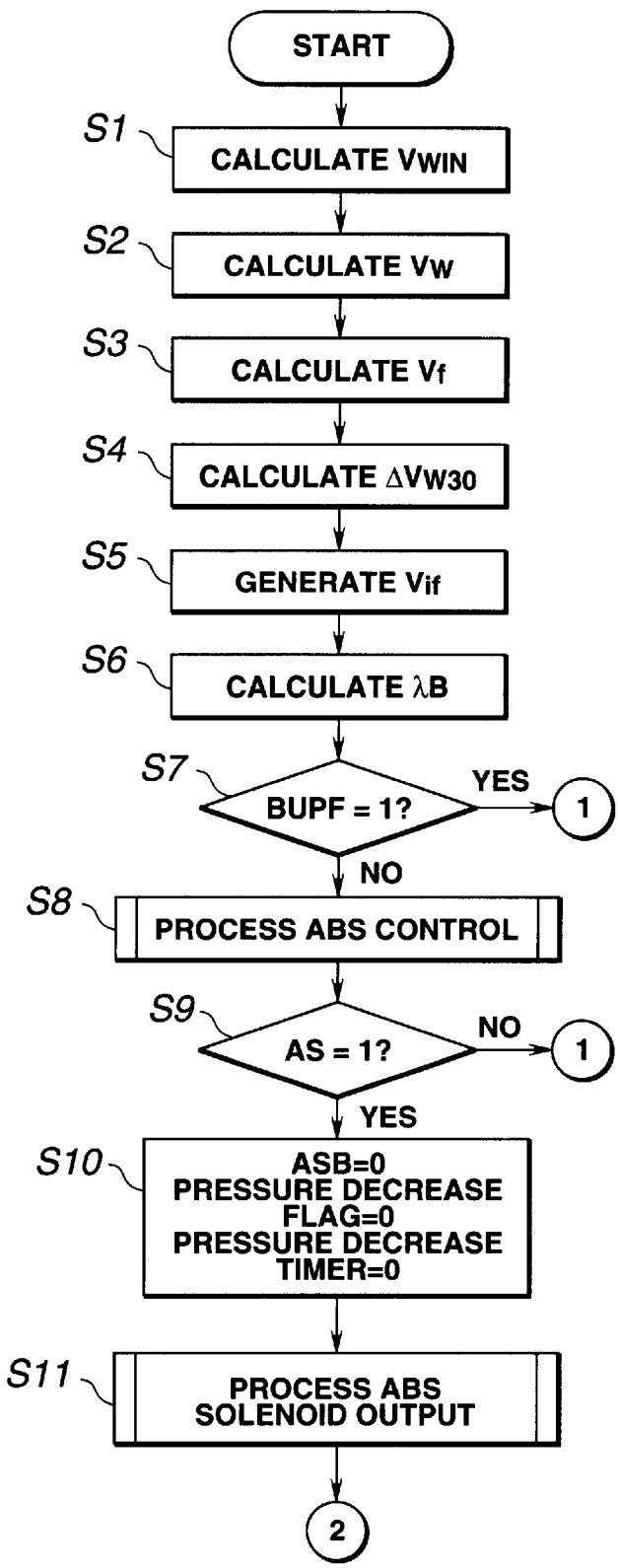
FIGS. 4 and 5 are integrally an operational flowchart representing a braking control main routine executed in the first preferred embodiment according to the present invention.
Figure 5:
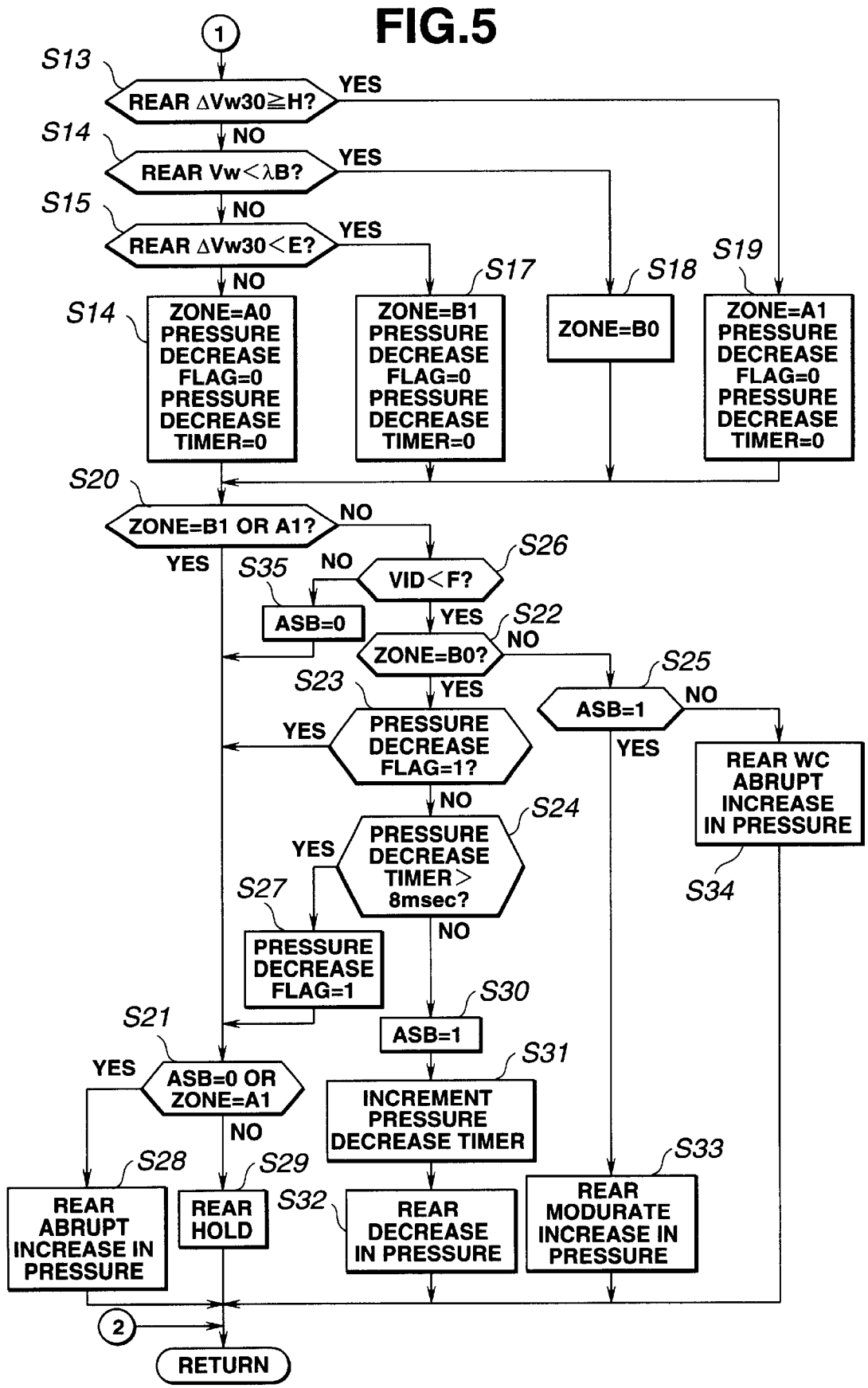

FIGS. 4 and 5 integrally show a whole brake control executed by the controller 12 in the first preferred embodiment shown in FIG. 1.

In the brake control, a first control (so-called, an ABS control) in which the brake liquid pressure is controlled for each road wheel to prevent a road wheel lock during the vehicular braking and a second control (so-called, a braking force distribution control) to control the braking liquid pressure of the rear road wheels so that the braking liquid pressures for the rear right and left road wheels doe not become excessive during the braking.

The above-described brake control shown in FIGS. 4 and 5 is executed whenever 10 milliseconds have passed.

It is noted that the controller 12 shown in FIG. 1 includes a microcomputer having a CPU (Central Processing Unit) 12a; a ROM (Read Only Memory); and a RAM (Random Access Memory); an Input Port; an Output Port; and a common bus.

At a step S1, the CPU 12a reads a number of pulses ND generated and outputted from each road wheel velocity sensor 13 for each 10 millisecond period and the period TD to derive a sensor frequency and calculates a raw road wheel velocity Vwin.

At a step S2, the CPU 12a filters noises and variations due to a rotor eccentricity included in the raw road wheel velocities Vwin to derive a control-purpose road wheel velocity Vw.

At a step S3, the CPU 12a prepares a filtering road wheel velocity Vf used to calculate a pseudo vehicular body velocity VI by which a limitation of an acceleration/deceleration is placed on a variation in the control-purpose road wheel velocity Vw.

It is noted that the limitation on a vehicular acceleration/deceleration means provisions of upper and lower limits on a rate of variation in each road wheel velocity to prevent a variation in each road wheel velocity equal to or exceeding a variation in an actual vehicular body velocity due to slips on each or any one of the road wheels during the vehicular acceleration or deceleration.

At a step S4, the CPU 12a of the controller 12 calculates a control purpose road wheel acceleration $\Delta$ Vw30 (Namely, an average acceleration of the control purpose road wheel velocity Vw for 30 milliseconds) according to the previous control purpose road wheel velocity Vw30 before 30 milliseconds and the present control purpose road wheel velocity.

At a step S5, the CPU 12a of the controller 12 selects one of the front right and left road wheel velocities Vw which is higher than the other to prepare a select-high road wheel velocity Vif.

At a step S6, the CPU 12a of the controller 12 generates a start threshold value $\lambda$B and an acceleration threshold F used for the driving force distribution control.

The detailed processing thereof will be described later.

At a step S7, the CPU 12a of the controller 12 determines whether a back-up control flag BUPF representing the execution of the back-up control as will be described later is set to "1". If BUPF=1, the routine goes to a step 13. If BUPF$\neq$1 (BUPF=0) at the step S7, the routine goes to a step S8.

At the step S8, the CPU 12a of the controller 12 executes the ABS control as a subroutine.

The contents of the ABS control are well known. However, the ABS control will briefly be described below with reference to FIG. 6.

Figure 6:
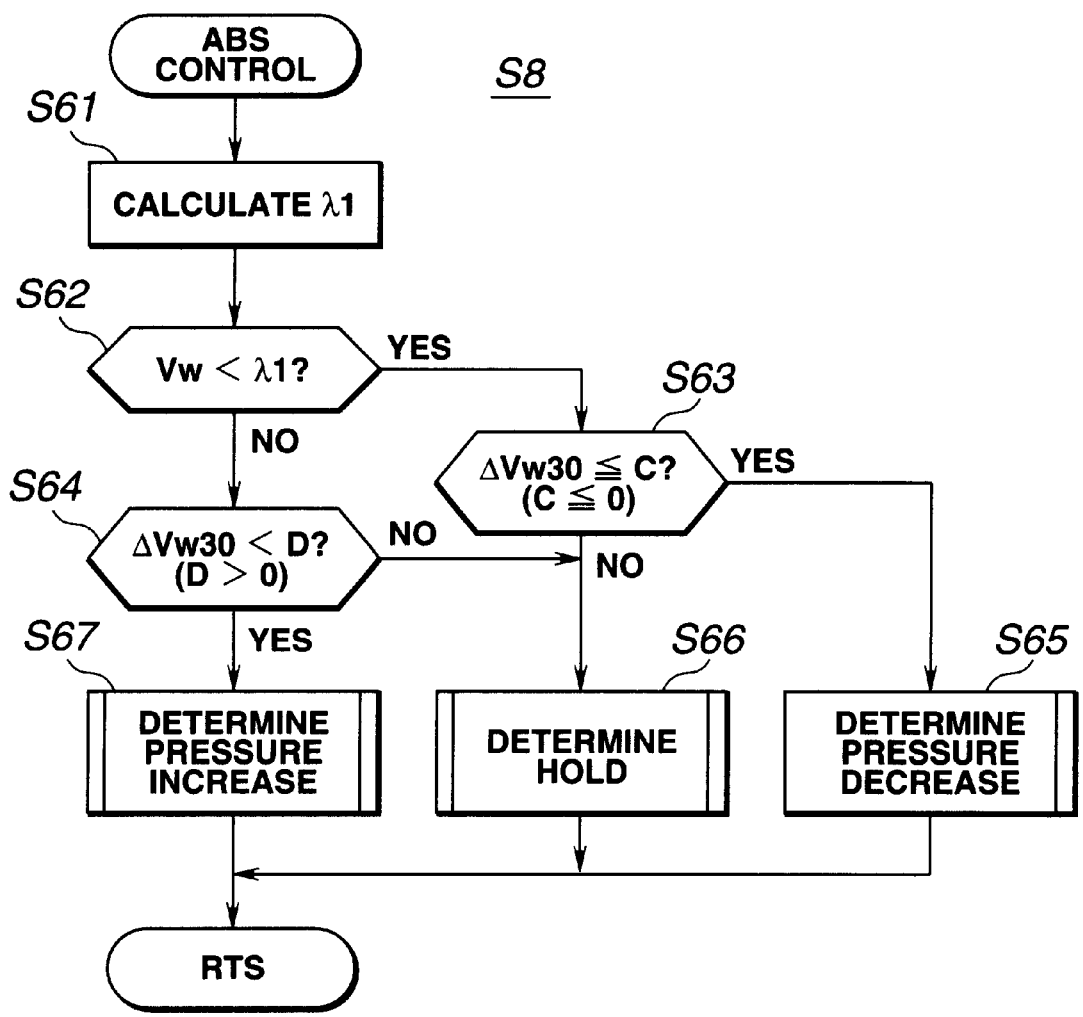
FIG. 6 is an operational flowchart representing an ABS control subroutine in the case of the first preferred embodiment shown in FIG. 1.

That is to say, at a step S61 in FIG. 6, the CPU 12a of the controller 12 calculates a pressure decrease threshold value $\lambda$1 used for the ABS control. At a step S62, the CPU 12a of the controller 12 determines whether the control-purpose road wheel velocity Vw is smaller than the pressure decrease threshold value $\lambda$1 for each road wheel.

If Vw<$\lambda$1 (Yes) at the step S62, the routine goes to a step S63.

At the step S63, the CPU 12a of the controller 20 determines whether the control purpose road wheel acceleration $\Delta$Vw30 is smaller than a set value C (C$\leq$0). If $\Delta$Vw30$\leq$C (Yes) at the step S63, the routine goes to a step S63 since the corresponding road wheel has the tendency of lock. At the step S65, the CPU 12a of the controller 12 determines the pressure decrease as will be described later. If ΔVw30>C (No) at the step S63, the routine goes to a step S66 in which the CPU 12a of the controller 12 determines a hold of pressure since the corresponding road wheel has the tendency to return to the pseudo vehicular body velocity VI.

On the other hand, if Vw>λ1 at the step S62 (No), the routine goes to a step S64 and the CPU 12a of the controller 12 determines whether the control purpose road wheel acceleration ΔVw30 is below a set value D (D>0) at the step S64.

If ΔVw30>D (yes) at the step S64, the CPU 12a of the controller 12 determines that the corresponding road wheel velocity has been returned to the pseudo vehicular velocity and the routine goes to a step S67 in which the CPU 12a of the controller 12 determines a pressure increase as will be described later.

On the other hand, if ΔVw30≦D (No) at the step S64, the routine goes to the step S66.

On the basis of the pressure decrease, the pressure hold, and the pressure increase, an output processing against the solenoid operating the switching valve 5 is carried out so as to prevent a vehicular road wheel lock during the braking with the road wheel velocity converged into a predetermined range with respect to the pseudo vehicular body velocity VI. It is noted that during the execution of this ABS control, an ABS flag AS is set to 1 at a time point at which an initial pressure decrease processing is executed. Thereafter, the ABS flag AS is reset to 0 when the pseudo vehicular body velocity VI is as low as being equal to or below a predetermined value or when a pressure decrease processing time is in excess of a set time duration.

Referring back to FIG. 4, the CPU 12a of the controller 12 determines whether the ABS control is being carried out depending on the status of the ABS flag AS at the step S9. If AS=1 (Yes) at the step S9, the routine goes to a step S10. If AS=0 (AS≠1, No) at the step S9, the routine goes to a step S13 as will be described later.

At the step S10, the CPU 12a of the controller 12 clears a driving force distribution control flag ASB to zero, the driving force distribution control flag ASB representing the execution of the driving force distribution control, clears a pressure decrease flag and a pressure increase timer to zero.

At a step S11, an output processing for the solenoid of the switching valve 5 is carried out and, then, the routine returns to the step S1.

Next, the routine goes from the step S9 to the step S13 if AS=0 at the step S9. At the step S13 shown in FIG. 5, the CPU 12a of the controller 12 determines whether the control-purpose road wheel acceleration ΔVw30 for he rear right and left road wheels RL and RR is equal to or above a set value H (for example, H=0.8 g).

If the rear road wheel acceleration ΔVw30 is equal to or above the set value H (Yes) at the step S13, the CPU 12a of the controller 12 determines that the corresponding read road wheel is being returned to the pseudo vehicular body velocity VI and the routine goes to a step S19 to prepare the pressure increase.

At the step S19, a determination zone ZONE=A1 on the vehicular running situation and both of the pressure decrease flag and the pressure increase timer are cleared to zero.

On the other hand, if ΔVw30<H at the step S13, the routine goes to a step S14 in which the CPU 12a of the controller 12 determines the control-purpose road wheel velocity Vw used for the control purpose for the rear road wheels is smaller than the start threshold value λB. If Vw≧λB at the step S14 (No), the routine goes to a step S15.

If Vw<λB at the step S14, the routine goes to a step S18 to prepare the pressure decrease (pressure boosting suppression) since it is necessary to execute the braking force distribution control. At the step S18, the determination zone ZONE=B0 on the vehicular running situation.

At the step S15, the CPU 12a of the controller 12 determines whether the control-purpose road wheel acceleration ΔVw30 used for the control purpose on the rear right and left road wheels RR and RL is smaller than a predetermined minus set value E (for example, E=−3.6 G). If ΔVw30<E (Yes) at the step S15, the routine goes to a step S17 to prepare the pressure hold state since the corresponding rear road wheel indicates the lock tendency to a degree requiring the ABS control. In this case, the determination zone ZONE=B1 and the pressure decrease flag and pressure decrement timer are reset to zero (refer to the step S17 of FIG. 5). It is noted that since before reaching to the step S17, the pressure decrease has already been carried out at the step S14 and the step S18 (ZONE=B0), the pressure hold has been prepared at the step S17.

On the other hand, if ΔVw30≧E at the step S15 (No), the routine goes to a step S16 in which the CPU 12a of the controller 12 to prepare a minute pressure increase (pressure boosting suppression) or an abrupt pressure increase, sets the determination zone ZONE as A0 (ZONE=A0) and resets the pressure decrease flag and the pressure decrease timer to zero.

At the subsequent steps S20 through S25, the CPU 12a of the controller 12 carries out the determination on the vehicular running situation on the basis of the determination zone ZONE, the braking force distribution control flag AS13, the pressure decrease flag, and pressure decrease timer. Furthermore, at the step S26, the CPU 12a determines whether the braking force distribution control should be allowed. Then, at the steps S28, S32, S33, and S34, the solenoid processing to operate the switching valve 5 is executed.

It is noted that the determination zone ZONE on the vehicular running situation will be described hereinbelow.

The zone determination is based on one of the rear road wheel control purpose road wheel velocities VWRR (or VwRL) and the control-purpose road wheel acceleration ΔVw30.

Figure 7:
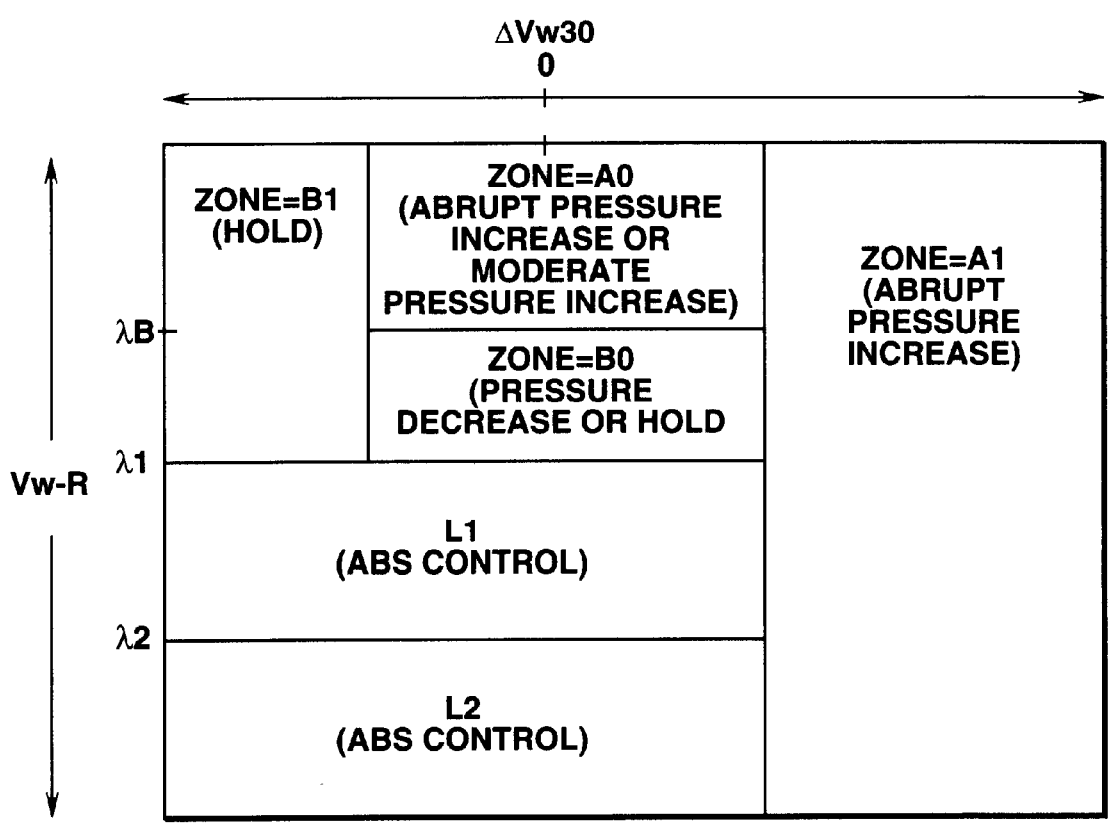
FIG. 7 is a zone characteristic graph used for determining a vehicular running situation.

In the embodiment, the zone is classified as shown in FIG. 7. In the state where the braking force distribution control is executed, four kinds of zones of A0, A1, B0, and B1 are selected. In FIG. 7, the zones denoted by L1 and L2 are zones selected during the execution of ABS control.

Referring back to FIG. 5, at a step S20, the CPU 12a determines whether ZONE=B1 or A1.

If either ZONE=B1 or ZONE=A1 (Yes) at the step S20, the routine jumps to a step S21 in which the CPU 12a determines if either the braking force distribution control flag ASB=0 or ZONE=A1 (Yes) at the step S21, the routine goes to a step S28 in which an abrupt pressure increase process is executed.

It is noted that the abrupt pressure increase process means that the switching valve 5 connected hydraulically to the wheel cylinders 3RR and 3RL on the rear right and left road wheels is under the pressure increase states as shown in FIG. 2 and means that the pressure increase at a remarkably high rate is possible according to its necessity.

On the other hand, if the CPU 12a determines that neither ASB=0 nor ZONE=A1 is satisfied (No) at the step S21, the routine goes to a step S29 in which the switching valve 5 connected to the rear right and left wheel cylinders 3RR and 3Rl is under the hold state.

If neither ZONE=B1 nor ZONE=A1 is determined (No) namely, ZONE=A0 or ZONE=B0 at the step S20, the routine goes to a step S26 in which the CPU 12aq determines whether a vehicular body acceleration/deceleration VID is below a negative acceleration threshold F(although the negative acceleration threshold F will be described later, coefficients Xf and Xr for the acceleration threshold values derived in proportion to a pair of left and right road wheel velocity differences use values of X1, X2 Xf, and X2 Xr).

The execution of the braking force distribution control is allowed only if VID<F at the step S26 and the routine goes to a step S22.

If VID≧F at the step S26, the routine goes to a step S35 in which the braking force distribution control flag ASB is reset to zero and, thereafter, goes to the step S21.

It is noted that the above-described vehicular body acceleration/deceleration VID can be generated on the basis of a detected value of a vehicular body longitudinal acceleration sensor (not shown) to detect the longitudinal acceleration of the vehicular body, may be generated according to a variation rate of a pseudo vehicular body velocity VI formed on the basis of the select-high road wheel velocity Vif or according to a moving average of the pseudo vehicular body velocity VI within a predetermined period of time. Or alternatively, the vehicular body acceleration/deceleration VID may be prepared with each peak value indicating each point of turn from the increase direction to the decrease direction.

At the step S22, the CPU 12a determines whether ZONE=B0. If ZONE=B0 (Yes) at the step S22, the routine goes to a step S23.

At the step S23, the CPU 12a determines whether the pressure decrease flag=1. If the pressure decrease flag=1 (after the pressure decrease for a predetermined period of time is carried out) at the step S23 (Yes), the routine goes to the step S21. If the pressure decrease flag≠0 (No) at the step S23, the routine goes to a step S24. At the step S24, the CPU 12a determines whether the count value of the pressure decrease timer indicates excess of 3 milliseconds. If exceeds 3 mS (Yes) at the step S24, the routine goes to a step S27 in which the pressure decrease flag is set to 1 and goes to the step S21. On the other hand, if the pressure decrease timer indicates equal to or below 3 mS (No) at the step S24, the routine goes to a step S30 in which the braking force distribution control flag ASB is set to "1" (This means that the execution of the braking force distribution control is started). Furthermore, after the pressure decrease timer is incremented by one at the step S31, the routine goes to a step S32. At the step S32, the CPU 12a carries out the pressure decrease process such that the switching valve 5 connected to the rear right and left wheel cylinders 3RR and 3RL is under the pressure decreased state. It is noted that the pressure decrease timer counts the elapsed time duration from a time at which the switching valve 5 is set under the pressure decrease state and the pressure decrease flag is set to 1 upon a time point at which the elapsed time exceeds 3 mS.

If ZONE≠B0 at the step S22 (No), i.e., ZONE=A0, the routine goes to a step S25 to determine if ASB=1. If ASB≠1 (ASB=0 and no execution of the braking force distribution control is indicated), the routine goes to a step S34 in which the same abrupt pressure increase process as the step S28, namely, the process such that the switching valve 5 connected to the wheel cylinders 3RR and 3RL for the rear right and left road wheels is under the pressure increase states. If ASB=1 (Yes) at the step S25, the routine goes to a step S33 in which the minute pressure increase process (boosting pressure suppression) is carried out. It is noted that the minute pressure increase is such that a predetermined limitation is placed on a valve open time for the switching valve 5 to increase slightly the pressure at a small rate.

In the braking force distribution control described above, the routine goes to the step S28 if ZONE=A1 or ASB=0, the routine goes to the step S29 if ZONE=B1 or both of ZONE=B0 and the pressure increase flag=1, and the routine goes to the step S32 if ZONE=B0, the pressure decrease flag=0, and the pressure decrease timer≦3 mS.

The pressure increase at the steps S33 and S34 is carried out if ZONE=A0. The minute pressure increase at the step S33 is carried out if ASB=1. The abrupt pressure increase at the step S34 is carried out if ASB=1.

Figure 8:
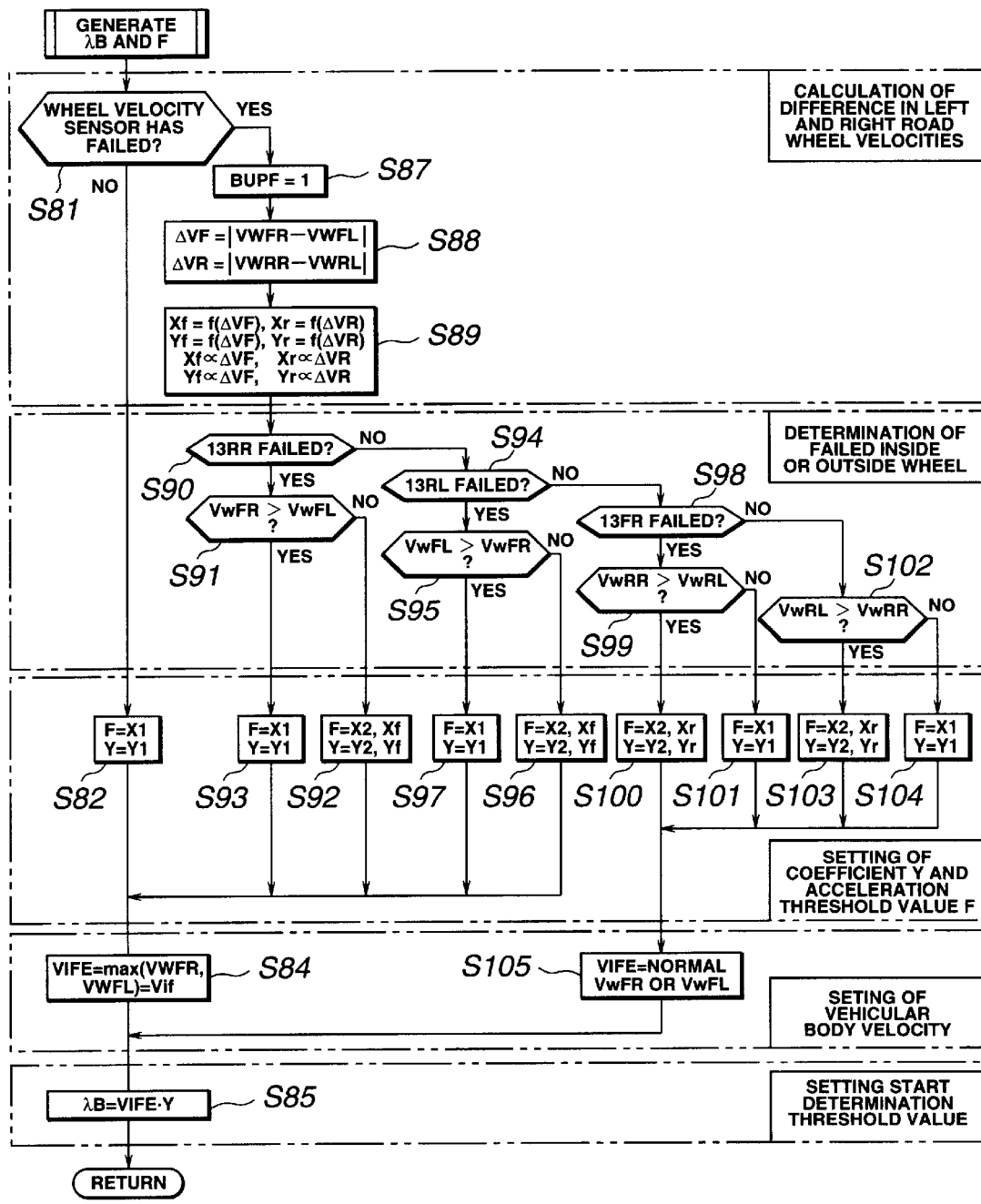
FIG. 8 is an operational flowchart representing a preparation subroutine for a predetermined start threshold value $\lambda B$ and an acceleration threshold value F in the first preferred embodiment shown in FIG. 1.

Next, FIG. 8 shows a setting process of the start threshold value λB and the acceleration threshold F at the step S6 of FIG. 4.

The CPU 12a determines, at a step S81, whether any one of the road wheel velocity sensors 13 (13FR, 13FL, 13RR, and 13RL) has failed. If no failure occurs (No) at the step S81, the routine in FIG. 8 goes to a step S82. If any one of the sensors 13 has failed (Yes) at the step S81, the routine goes to a step S87. The determination of the failure in the vehicular road wheel velocity sensors is well known and is based on a broken wire or a short-circuiting in the sensor circuits. The detailed method of the failure determination will be omitted herein.

At the step S82, the CPU 12a sets the acceleration threshold value F to a predetermined value X1 and sets a coefficient Y and to set the start threshold value λB to a predetermined value Y1 (Y=Y1).

At the subsequent step S84, the CPU 12a sets a braking-force-distribution-control purpose control vehicular body velocity VIFE to the select-high road wheel velocity Vif, namely, to one of the detected values of the front right and left road wheel velocities which is higher than the other.

Next, at a step S85, the CPU 12a calculates the start threshold value λB as follows: λB=VIFE×Y.

On the other hand, at the step S87, the CPU 12a sets a back-up control flag BUPF to "1" and, thereafter, calculates a difference in the right and left road wheel velocities.

In details, at a step S88, the CPU 12a calculates differences of front and rear outer and inner (left and right) road wheel velocities indicating a degree of vehicular turning as follows:

Difference in Front Right and Left Road Wheel Velocities
ΔVF=|VwFR−VwFL|; and

Difference in Rear Left and Right Road Wheel Velocities
ΔVR; ΔVR=|VwRR−VwRL|.

Next, at a step S89, the CPU 12a derives acceleration threshold coefficients Xf and Xr required to derive the acceleration threshold F and velocity threshold value coefficients Yf and Yr required to derive the start threshold value λB on the basis of respective right and left road wheel velocity differences ΔVF and ΔVR calculated at the step S88.

Xf=f(ΔVF), Xr=f(ΔVR) wherein f denotes the proportional function.

Yf=f(ΔVF), Yr=f(ΔVR) wherein f denotes the proportional function.

Next, on which of the failed road wheel velocity sensor is placed is determined as follows:

At a step S90, the CPU 12a of the controller 12 determines if the failed road wheel velocity sensor is placed on the rear right road wheel RR. If the failed sensor is placed on the rear right road wheel RR, the CPU 12a determines, at a step S90, if the front right road wheel velocity VwFR is higher than the front left road wheel velocity VwFL, that is to say, determines if the failed rear right road wheel velocity sensor 13RR is placed on an outer wheel with respect to a turning direction on the basis of whether the vehicle is turning in a left direction.

If Yes, namely, the failed rear right road wheel velocity sensor is placed at the outer wheel at the step S90, the routine goes to a step S93. If No, namely, the failed rear right road wheel velocity sensor is placed at an inner wheel with respect to the turning direction, the routine goes to a step S92. At the step S92, the acceleration threshold F is set according to X2 Xf (It is noted that X2 denotes the acceleration threshold value during the failure) with the degree of turning derived at the step S89. Furthermore, the coefficient Y used for setting the start threshold $\lambda B$ is set to Y=Y2 Yf (It is noted that Y2 denotes the start threshold value during the failure). On the other hand, at the step S93, the CPU 12a sets the threshold values used for a normal control as the acceleration threshold value F=X1 and the start threshold value $\lambda B$=Y1.

When the failed road wheel velocity sensor 13 is the inner wheel at the rear road wheel side with respect to the turning direction, the acceleration threshold value F and the start threshold value $\lambda B$ are modified to a tendency easy to be boosting pressure suppression. When the failed road wheel velocity sensor is the outer wheel at the rear road wheel side, there is a tendency to be difficult to undergo the boosting pressure suppression as compared with the case where the failed road wheel velocity sensor is in the inner wheel at the rear road wheel side.

If the failed road wheel velocity sensor 13 is not placed on the rear right road wheel RR at the step S90, the routine goes to a step S94 in which the CPU 12a determines whether the failed road wheel velocity sensor is, in turn, the rear left road wheel velocity sensor 13RL. If Yes at the step S94, the CPU 12a determines if the failed road wheel velocity sensor is placed on either the inner or outer wheel with respect to the turning direction in the same way as the steps S91 through S93 and sets the respective threshold values F and $\lambda B$.

Furthermore, if No at the step S91 (the failed sensor is not the rear left road wheel velocity sensor 13RL), the routine goes to a step S98. At the step S98, the CPU 12a determines whether the failed sensor is the front right road wheel velocity sensor 13FR.

If Yes at the step S98 (the failed sensor is 13FR, the routine goes to a step S99 in which the CPU 12a determines if the failed front right road wheel velocity sensor 13FR is placed at either the outer or inner wheel with respect to the turning direction on the basis of a determination of whether the rear right road wheel velocity sensor VwRR is higher than the rear left road wheel velocity sensor VwRL.

If 13FR is the outer wheel at the step S99 (Yes), the routine goes to a step S100. If 13FR is the inner wheel (No) at the step S99, the routine goes to a step S101.

At the step S100, the CPU 12a sets the acceleration threshold value F according to X2 Xr and sets the coefficient Y as follows: Y=Y2 Yr used to set the start threshold value $\lambda B$.

Thus, both of the acceleration threshold value F and start threshold value $\lambda B$ are modified to the tendency easy to be under the boosting pressure suppression.

Thus, at the step S101, the CPU 12a sets the acceleration threshold value of F=X1 and the start threshold value $\lambda B$=Y1.

Thus, the acceleration threshold value F and the start threshold value $\lambda B$ indicates that the pressure boosting suppression becomes difficult to be subject to the boosting pressure suppression as compared with the case wherein the failed road wheel velocity sensor is the front road wheel side outer wheel.

If the failed road wheel velocity sensor is not the front right road wheel velocity sensor 13FR (No) at the step S98, the CPU 12a can spontaneously determine that the failed sensor is the front left road wheel velocity sensor 13FL. On the basis of the failed sensor identification at the step S98, the CPU 12a can determine the inner or outer wheel during the turning in the same way as the steps S99 through S101.

It is noted that a step S105 is a step passing only if either one of the front right or left road wheel velocity sensor 13FR or 13FL has failed.

At the step S105, the control purpose vehicular body velocity VIFE used for the braking force distribution control at the step S84 as the normally functioning road wheel velocity Vw and the routine goes to a step S85 in which $\lambda B$=VIFE Y.

The magnitude relationship of the acceleration threshold values X1 and X2 and the coefficients Y1 and Y2 set at the steps S82, S92, S93, S96, S97, S100, S101, S103, and S104 is X2>X1 (for example, X≈−0.2 g) and Y2>Y1 (for example, Y1≈0.98).

Next, an operation of the first embodiment will be described below according to the identification result of the failed road wheel velocity sensor 13FR through 13RL.

A) A case where all vehicular road wheel velocity sensors 13 (13FR, 13FL, 13RR, and 13RL) have operated normally.

If all road wheel velocity sensors 13FR, 13FL, 13RR, and 13RL are determined to be operated normally, the routine shown in FIG. 8 goes from the step S81 to the step S82 (step S81→step S82) so that a small value X1 is set as the acceleration threshold value F and the small value Y1 is set to the coefficient Y when preparing the start threshold value $\lambda B$ and the acceleration threshold value F.

Hence, on the basis of the calculation at a step S85, the start threshold value $\lambda B$ is prepared by VIFE Y1. This value $\lambda B$ is a value reduced by an offset value ofs (Y1) from the vehicular body velocity VIFE as shown at a left side with respect to a failure time point t91 in FIG. 9.

B) A case where during the turning the front road wheel velocity sensor (13FR or 13FL) has failed.

In a case where, during the braking and the turning to the left, the front right road wheel velocity sensor 13FR has failed from the normally functioning state, the flow of process in FIG. 8 indicates as: step S81→step S88→step S89→step S90→step S94→step S98→step S99→step S100. Together with the acceleration threshold value F set to X2 Xr and the coefficient Y to calculate the start threshold value $\lambda B$ set to Y2 Yr.

Figure 9:
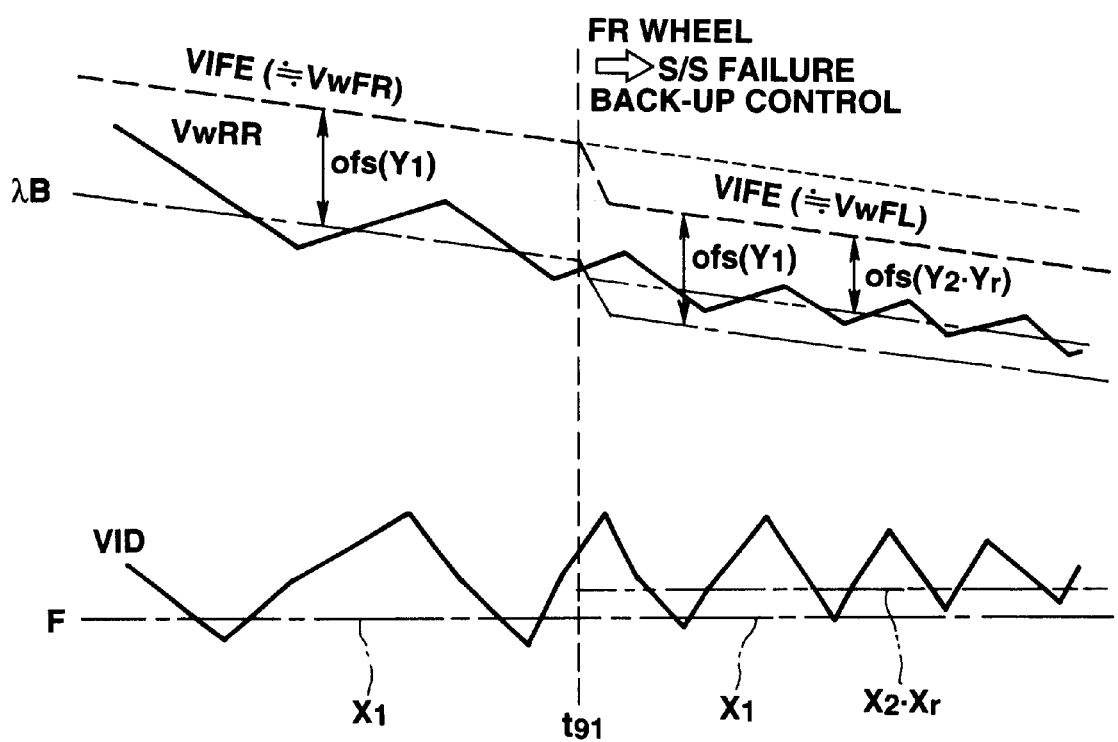
FIG. 9 is a timing chart representing an example of operations of the brake controlling apparatus when a front right road wheel velocity sensor has failed in the case of the first preferred embodiment.

It is noted that FIG. 9 shows an operation example when the front right road wheel velocity sensor 13FR (which gives the outer wheel during the left turning) has failed. In the normal state, during the left turning, the front right road wheel velocity VwFR which is the outer wheel during the turning becomes higher than the front left road wheel velocity VwFL so that the select-high road wheel velocity Vif (=the vehicular body velocity VIFE used for the braking force distribution control) is formed by means of the front right road wheel velocity VwFR. In this state, if the front right road wheel velocity sensor 13FR has failed, the vehicular body velocity VIFE for the braking force distribution control is formed by means of the normally functioning front left road wheel velocity VWfL (based on the step S105 in FIG. 8).

In this case, when the start threshold value $\lambda B$ is formed using the coefficient Y1 which is the same as the normally functioning case, the start threshold value λB gives the value which is offset toward the lower velocity side by the offset value ofs (Y1). The offset value ofs is reduced according to a reduction of the vehicular body velocity VIFE.

On the contrary, in the first embodiment, if the failed vehicular road wheel velocity sensor 13 is the front outer wheel during the turning, the acceleration threshold value F is set to X2 Xr which is larger than the above-described normal X1 and the coefficient Y to derive the start threshold value λB is set to Y2 Yr which is larger than Y1 used during the normal case. Consequently, the start threshold value λB indicates the offset value ofs (Y2 Yr) whose quantity to the vehicular body velocity VIFE is shallower than that in the normal case.

In addition, the acceleration threshold value F is modified to a larger value as the turning velocity becomes high (X1→X2 Xr) if the front outer wheel has failed (namely, as the offset quantity of the start threshold value λB becomes shallow) in the same way as the start threshold value λB.

These offset quantities are proportional to Xr and Yr. The values of Xr and Yr are the function of the normally functioning rear road wheel velocity difference ΔVR. The function f(ΔVR) is set to a function such that the offset quantity becomes shallower (smaller) as the turning velocity becomes higher (the road wheel velocity difference ΔVR becomes large).

Hence, since, in a conventional case, the start threshold value λB is prepared with the offset quantity being deeper as the reduction in the vehicular body velocity VIFE is advanced when the vehicular body velocity VIFE is reduced due to the failure in the front outer wheel velocity sensor during the turning, the lock tendency becomes strong with the braking force distribution control becoming difficult to be started. However, in the first embodiment, the offset quantity of the start threshold value λB becomes shallow although the front outer wheel velocity sensor has failed and the vehicular body velocity VIFE becomes reduced so that the start threshold value λB is not so largely reduced as compared with the start threshold value λB used during the normal time.

In addition, some large value which is larger than the normal value is given to the acceleration threshold value F.

Hence, as shown in FIG. 9, the rear right road wheel velocity VwRR (also the rear left road wheel velocity VwRL according to the turning direction) becomes easy to be below the start threshold value λB and the vehicular body acceleration/deceleration VID becomes easy to be below the acceleration threshold F. That is to say, the boosting pressure suppression (pressure decrease and hold) by means of the driving force distribution control becomes easy to be carried out. Thus, the increase in the lock tendency on the rear road wheels caused by a start delay in the braking force distribution control can be prevented so that a deterioration of the vehicular running stability can be prevented. Especially, the offset quantity becomes shallower (smaller) as the turning velocity becomes higher which has a high possibility of deterioration in the running stability. Thus, the deterioration of the vehicular running stability can be prevented.

In the first embodiment, the offset quantity of the start threshold value λB is set to become shallower (smaller) so as to enable an easy execution of the braking force distribution control when the front outer wheel side road wheel velocity sensor 13 has failed.

However, too early start of the execution of the braking force distribution control may give an insufficient braking force so as to elongate the braking distance. However, in the first embodiment, the value of the acceleration threshold F is set as described above and the braking force distribution control is executed unless the acceleration (deceleration) is developed actually on the vehicle body. Thus, the insufficient braking force can be prevented from occurring.

On the other hand, if the front left road wheel velocity sensor 13FL has failed which is the inner wheel during the left turning, the start threshold value λB and the acceleration threshold value F are formed with the coefficients thereof set using the values of X1 and Y1.

Figure 10:
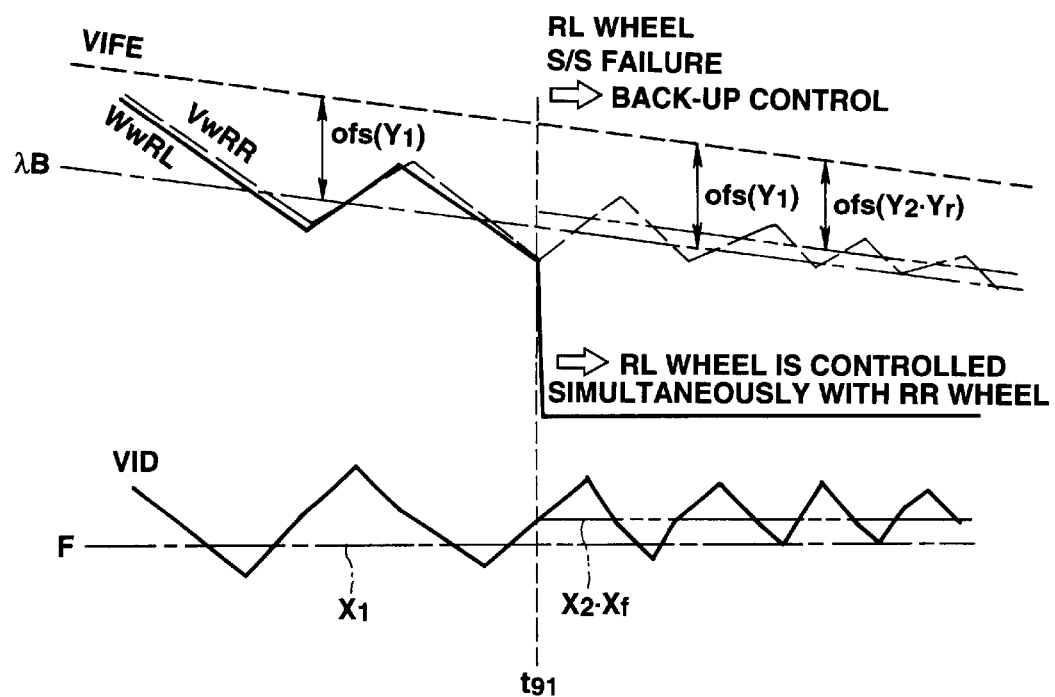
FIG. 10 is a timing chart representing an example of operation of the brake controlling apparatus when a rear left road wheel velocity sensor had failed in the case of the first preferred embodiment.

In this case, since the vehicular body velocity VIFE is formed according to the front right road wheel velocity VwFR of the front right road wheel which is the outer wheel and indicates the relatively high value, both of the start threshold value λB and the acceleration threshold value F do not become deeper as against the case wherein the outer wheel velocity sensor has failed (refer to FIG. 10). Even if the start threshold value λB and the acceleration threshold value F are formed with the normal values of X1 and Y1 used for the coefficients of X and Y, the normal braking force distribution control can be executed.

C) A case where the rear left road wheel velocity sensor 13RL which is the inner wheel during the vehicular turning to the left.

A counter-action when the rear left road wheel velocity sensor 13RL which is placed on the inner wheel side during the left turn from the normally operated state will be described below.

FIG. 10 shows the operation example when the rear left road wheel velocity sensor 13RL which is the outer wheel velocity sensor during the left turn of the vehicle.

In this case, the flow of process in FIG. 8 is as follows: step S81→step S88→step S89→step 90→step S94→step S95→step S96. In the start threshold value λB, the coefficient Y2 Yf is used to set the offset quantity ofs which is relatively shallow. In the acceleration threshold F, the coefficient X2 Xf is used to set the acceleration threshold F which is shifted toward the acceleration side than the normal value.

Hence, in this back-up control, the execution of the boosting pressure suppression such that the braking liquid pressure for the rear road wheels is decreased or held becomes easier to be executed than the normal case. An inconvenience such that since a synchronous control with the rear outer wheel during the turn of the vehicle which is normally operated and indicates high value of the velocity is carried out, the boosting pressure suppression against the inner wheel whose velocity is relatively low becomes slow so that the tendency of lock becomes strong can be eliminated and the deterioration of the vehicular running stability can be prevented.

In this case, since both of the start threshold value λB and the acceleration threshold value F are formed using the respective coefficients Xf and Yf which are the function of the front road wheel revolution velocity difference a ΔVF, the offset quantity during the high (abrupt) turning velocity is set to be shallower than that during the slow (moderate) turning velocity so that the boosting pressure suppression can become easier to be carried out. As the turning velocity becomes abrupt, the deterioration of the vehicular running stability can be prevented from occurring. In addition, since the acceleration threshold value F is set as described above, the vehicular deceleration can be assured and an insufficient deceleration force cannot occur.

D) A case where the rear right road wheel velocity sensor 13RR which is the outer wheel during the left turning.

If all of the road wheel velocity sensors 13 have been operated normally as described in the case of A and, thereafter, the rear right road wheel velocity sensor 13RR has failed which is the outer wheel velocity sensor during the left turn of the vehicle, the process flow in FIG. 8 is as follows: step S81→step S87→step S88→step S89→step S89→step S90→step S91→step S93.

In the same manner as the normal case as described above, Y1 and X1 are used as the coefficients to form the start threshold value λB and the acceleration threshold value F. Hence, the offset quantity of the start threshold value λB is set deeply as in the same manner as the normal case.

In the conventional case, if the synchronous control on the left and right road wheel velocities on the basis of the inner wheel whose revolution velocity is slow is carried out, a frequency of executions of the boosting pressure suppression becomes extremely high so that the lack in the braking force occurs. In the first embodiment, however, such the inconvenience as described above can be prevented from occurring and the sufficient braking force can be assured.

(Second Embodiment)

The vehicular brake controlling apparatus in a second preferred embodiment will be described in details.

In the second embodiment, the method of preparing the start threshold value λB and the acceleration threshold value F has been modified.

In the second embodiment, three kinds of values Xa, Xb, and Xc have been used for the formation of the acceleration threshold value F. Three kinds of values Ya, Yb, and Yc have been used to prepare the start threshold value λB. The magnitude relationship of each kind of values is as follows:

Xa>Xb>Xc and Ya>Yb>Yc.

In these inequalities, Xc is, for example, about −0.2 g, Yc is, for example, about 0.98.

Each adjacent value from among two inequalities may be used as being equal to each other. In summary, the other values Xa, Xb, Ya, and Yb are larger than the values of Xc and Yc, respectively.

Figure 11:
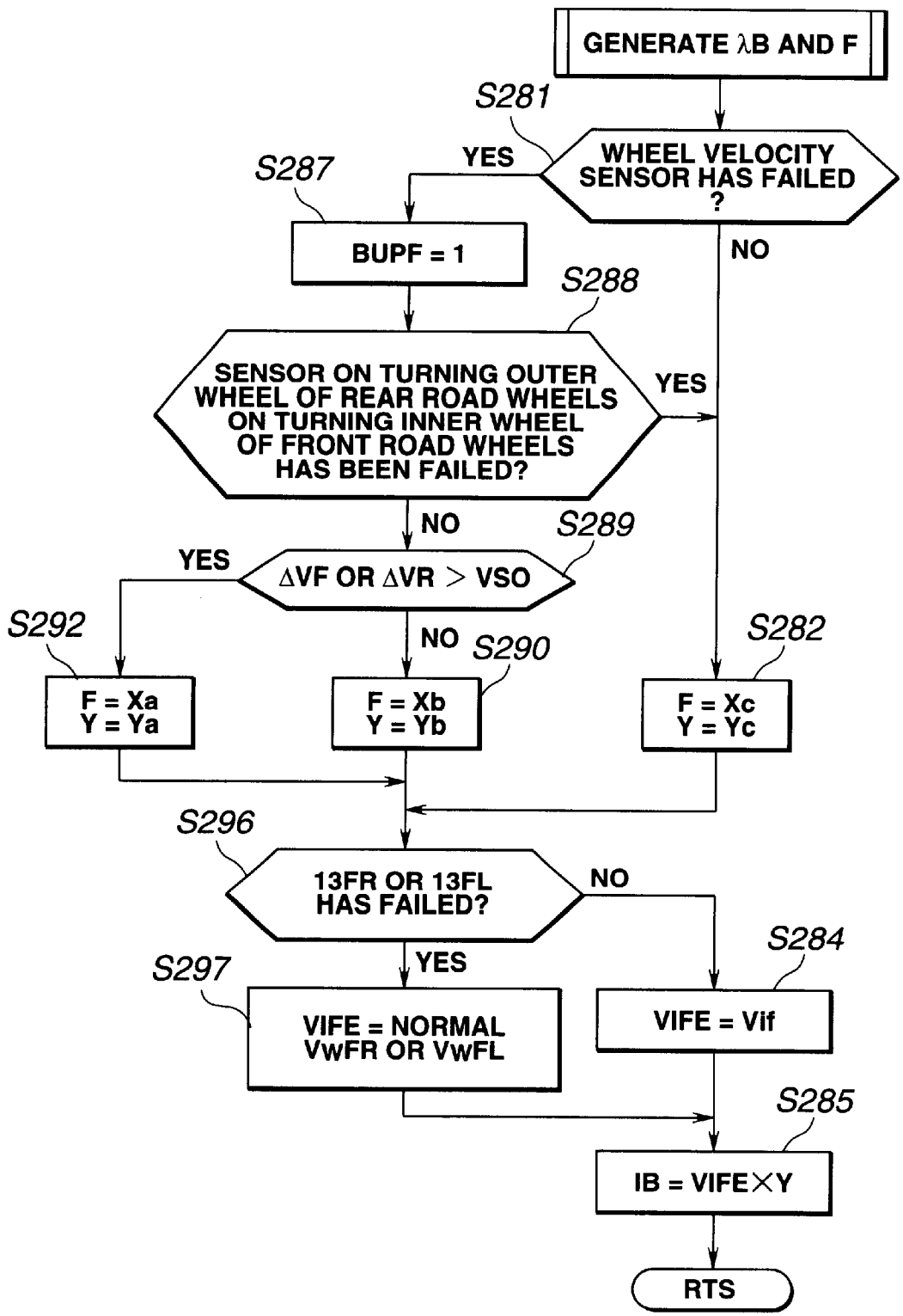
FIG. 11 is an operational flowchart representing a preparation subroutine for the predetermined start threshold value $\lambda B$ and the acceleration threshold value F in the case of a second preferred embodiment of the brake controlling apparatus according to the present invention.

FIG. 11 shows an operational flowchart of the vehicular brake controlling apparatus in a second preferred embodiment according to the present invention.

It is noted that if all of the vehicular road wheel velocity sensors 13 are operated normally, the flow of process is as follows: step S281→step S282→step S296→step S284→step S285. This flow of process is the same as the steps of: step S81→step S82→step S84→step S85 shown in FIG. 8 in the case of the first embodiment.

If any one of the road wheel velocity sensors 13FR through 13RL has failed (Yes) at the step S281, the routine goes to a step S287.

At the step S287, the CPU 12a sets the back-up flag BUPF to "1". At the subsequent step S288, the CPU 12a determines if the failed road wheel velocity sensor is the outer wheel during the turn of the vehicle.

If the failed road wheel velocity sensor is either the rear road wheel side outer wheel velocity sensor or the front road wheel side inner wheel velocity sensor, the routine goes to the step S282.

If No at the step S288, the routine goes to a step S289.

It is noted that the determination of whether the failed road wheel velocity sensor 13 is either the outer wheel or inner wheel is based on the difference in the right and left road wheel velocities which is normally operated as in the same manner as described in the first embodiment.

However, the determination may be based on the detected value of a steering angle sensor installed on a vehicular steering wheel.

At a step S289, the CPU 12a determines whether either of the two right and left road wheel velocity differences ΔVF or ΔVR whose related sensors are normally operated is larger than a predetermined value VS0.

If either ΔVF or ΔVR>V0, the routine goes to a step S292.

At the step S292, the CPU 12a sets the acceleration threshold value F=Xa and selects Ya as the coefficient Y.

At a step S296, the CPU 12a determines if the failed road wheel velocity sensor is located at the front road wheels.

If NO at the step S96, the routine goes to a step S284. If Yes at the step S296, the routine goes to a step S297.

At the step S297, the CPU 12a sets the vehicular body velocity VIFE used for the braking force distribution control on the basis of one of the front road wheel velocities whose related sensor is normally operated.

At the step S284, the CPU 12a sets the vehicular body velocity VIFE to be equal to the select-high road wheel velocity Vif.

Next, the operation in the second embodiment will be described below.

A) A case where all road wheel velocity sensors are normally operated.

If all of the road wheel velocity sensors 13FR, 13FL, 13RL, and 13RR have failed, the process flow in FIG. 11 is indicated as follows: Step S281→step S282→step S296→step S284→step S285. The acceleration threshold value F is set to a smallest value Xc. The coefficient Y to form the start threshold value λB is set to a smallest value Yc.

Figure 12:
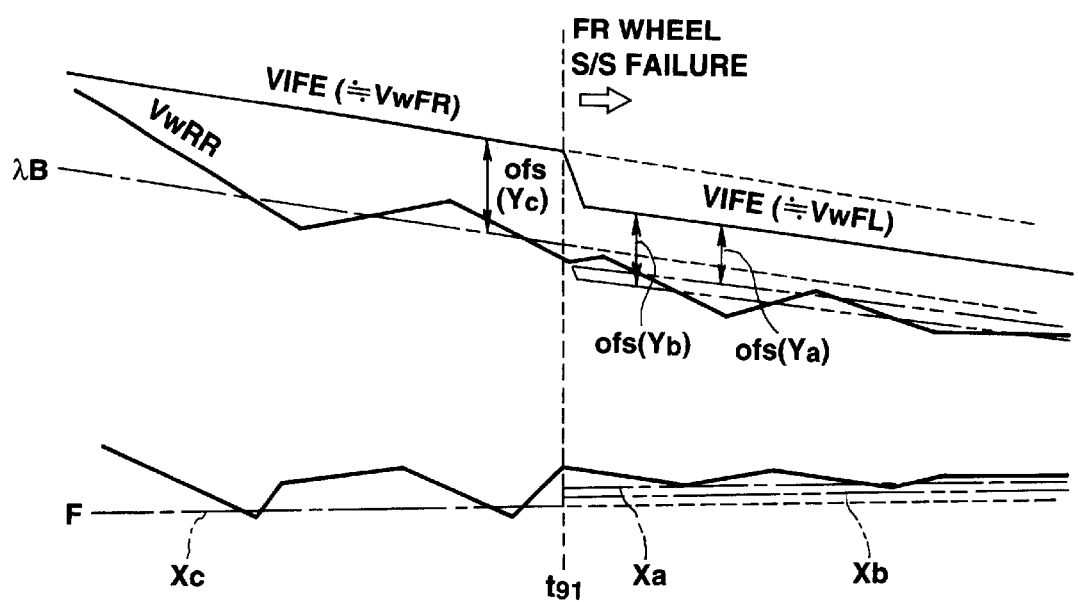
FIG. 12 is a timing chart representing an example of operation in the brake controlling apparatus when the front right road wheel velocity sensor has failed in the case of the second preferred embodiment.

Hence, the start threshold value λB is set to a depth shown in FIG. 12 before the failure of any one of the sensors 13FR through 13RL occurs.

B) A case where the road wheel velocity sensor at the front road wheel side outer wheel during the turn of the vehicle.

If the front road wheel side outer wheel velocity sensor 13FR or 13FL during the turn of the vehicle has failed, the flow of process in FIG. 11 is as follows: step S281→step S287→step S288→step S289.

If the turning velocity indicates high such as to exceed a predetermined velocity (the vehicle turns abruptly), the routine of FIG. 11 goes from the step S289 to the step S292. At the step S292, the CPU 12a sets the acceleration threshold value of F=Xa and uses Ya as the coefficient Y to derive the start threshold value λB.

FIG. 12 shows an operation example when the front right road wheel velocity sensor 13FR has failed during the left turn.

The vehicular velocity VIFE is formed by means of the front right road wheel velocity VwFR during the left turn when all of the sensors have been operated normally. However, if the front right road wheel velocity sensor 13 has failed, the value of VIFE is formed by the front left road wheel velocity VwFL and is reduced at the same time as the failure occurs. Hence, if the offset quantity of the start threshold value λB is formed in the same way as the normal case, the vehicular body velocity VIFE is reduced so that the braking force distribution control becomes difficult to be executed. In the second embodiment, however, if the turning velocity is high, the coefficient X for the acceleration threshold value F is set to Xa higher than the normal time and the coefficient Y to derive the start threshold value λB is set to Ya which is larger than Yc used when all sensors have been operated normally (normal case).

Figure 13:
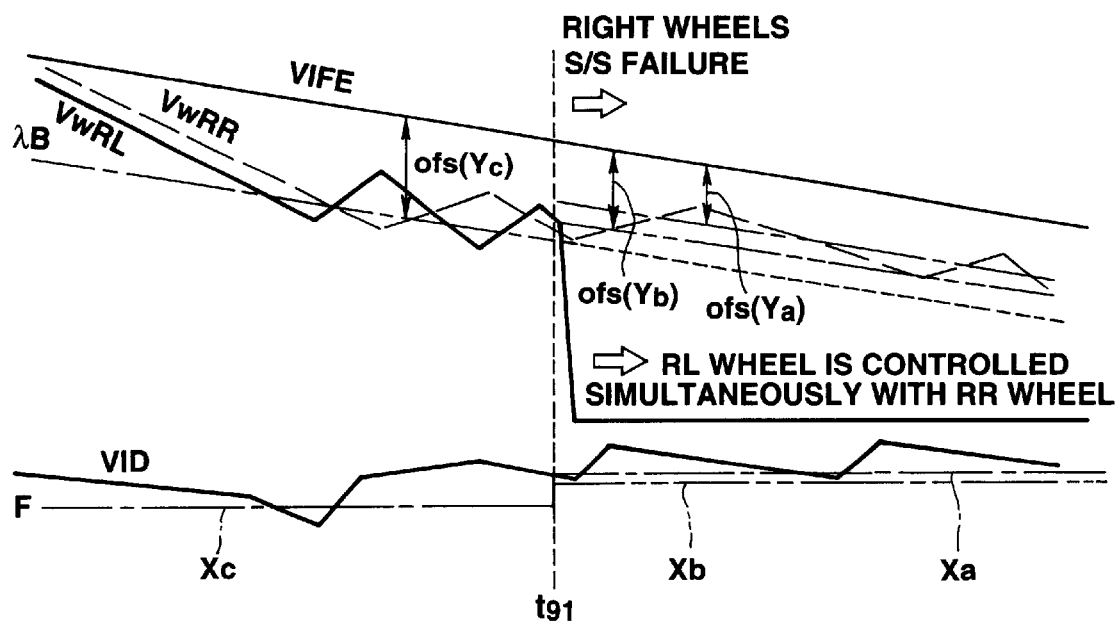
FIG. 13 is a timing chart representing an example of operation in the brake controlling apparatus when the rear left road wheel velocity sensor has failed.

In addition, when the vehicle turns moderately, Xb is set to the acceleration threshold value F and Yb is used for the coefficient Yb to derive the start threshold value λB. Consequently, the start threshold value λB has the shallow offset quantity set as shown in FIG. 13.

Furthermore, the offset quantity of the start threshold value λB is set to be shallower than the offset quantity during the moderate (low) turning velocity.

The acceleration threshold value F is set to be larger than that at the normal case.

In the second embodiment, if the front outer wheel velocity sensor has failed, the offset quantity of the start threshold value λB becomes shallower so that the boosting pressure suppression through the braking force distribution control becomes easier to be carried out.

Then, the increase in the lock tendency on the rear road wheels due to the start delay in the braking force distribution control can be prevented and the running stability can be assured. Especially, as the vehicle turns abruptly at high rate such as to be susceptible to the deterioration of the running stability, the offset quantity becomes shallow so that the running stability can be assured.

C) A case where the rear road wheel side inner wheel velocity sensor has failed.

If the rear road wheel side inner wheel velocity sensor has failed, the flow of process in FIG. 11 is as follows: step S281→step S287→step S288→step S289.

In the same way as the case where the front road wheel side outer wheel velocity sensor has failed, the offset quantity of the start threshold value λB is set to be shallower in accordance with the turning state.

Hence, in the back-up control described above, the boosting pressure suppression of the rear road wheel side liquid pressure becomes easier to be executed and the strong tendency of lock due to the synchronous control with the normal outer wheel can be eliminated.

Consequently, the determination of the running stability can be prevented.

Also in this case, the offset quantity during the abrupt turn is set to be shallower than the moderate turning. The boosting pressure suppression becomes easier to be executed and the determination of the running stability can be prevented.

In addition, the setting of the acceleration threshold value F carries out the assured deceleration and the insufficient deceleration force is not developed.

D) A case where either the front road wheel side inner wheel or the rear road wheel side outer wheel road wheel velocity sensor has failed.

If all of the road wheel velocity sensors have been operated normally and, thereafter, either the front road wheel side inner wheel velocity sensor or the rear road wheel side outer road wheel velocity sensor has failed, the flow of process in FIG. 12 is as follows: step S281→step S287→step S288→step S282.

Xc and Yc are used in the same way as the normal case for the acceleration threshold value F and the coefficient Y to form the start threshold value λB. Hence, the offset quantity of the start threshold value λB becomes deep as compared with the case wherein the front road wheel side outer wheel velocity sensor has failed. In addition, the acceleration threshold value F becomes low as compared with that in the case wherein either the front road wheel side outer wheel or the rear road wheel side inner wheel has failed.

In the back-up control described above, if either the front road wheel side inner wheel or the rear road wheel side outer wheel during the turn of the vehicle has failed, the offset quantity of the start threshold value is set so as not to be shallower but set so as to become equal to the value during the normal braking force distribution control. Hence, the braking force can be assured.

Furthermore, in the second embodiment, the acceleration threshold value F is selected from among Xa, Xb, and Xc and the coefficient Y to form the start threshold value λB is selected from among Ya, Yb, and Yc. The processing to set these values F and Y can be simplified.

It is noted that the conventional case described above corresponds to the brake controlling apparatus disclosed in the German Patent Application Publication No. DE-A1-44 14 980.

The entire contents of Japanese Patent Application P10-268481 (filed in Japan on Sep. 22, 1998) are herein incorporated by reference.

Although the present invention has been described by reference to certain embodiments described above, the present invention is not limited to the embodiments described above. Modifications and variations of the embodiments will occur to those skilled in the art in light of the above teachings.

For example, although in FIG. 2 the single switching valve 5 serves to carry out the pressure decrease, the pressure hold, and the pressure increase for the representative wheel cylinder 3, a normally open inflow valve in a two-position switching type which opens or closes the brake circuit 2 and a normally closed outflow valve in the two-position switching type may be used in place of the switching valve.

In addition, in each embodiment, the execution of the braking force distribution control may be determined on the basis of the start threshold value λB and the acceleration threshold value F. However, the execution of the braking force distribution control may be determined on the basis of at least the start threshold value λB.

The scope of the present invention is defined with reference to the following claims.

What is claimed is:

1. A vehicular brake controlling apparatus comprising:
 a brake unit to enable a suppression of boosting a braking liquid pressure independently of each wheel cylinder, each wheel cylinder operatively braking a corresponding one of vehicular front and rear road wheels according to the braking liquid pressure;
 a plurality of road wheel velocity sensors, each road wheel velocity sensor detecting a revolution velocity of the corresponding one of the road wheels and outputting a signal indicating the detected road wheel revolution velocity thereof; and
 a controller configured to be enabled to execute a braking force distribution control function as to controllably operate the brake unit to suppress the boosting in the braking liquid pressure for the rear road wheels on the basis of a revolution velocity difference between the front and rear road wheels derived from the signals outputted from the respective road wheel velocity sensors when the revolution velocity difference is in excess of a predetermined start threshold value and to be enabled to execute a back-up control function for the braking force distribution control function on the basis of the signals outputted from the other road wheel velocity sensors which are operated normally when detecting an occurrence of failure in any one of the road wheel velocity sensors, the controller being configured to modify the predetermined start threshold value used during the execution of the braking force distribution control function with all of the road wheel velocity sensors operated normally when executing the back-up control function.

2. A vehicular brake controlling apparatus as claimed in claim 1, wherein the controller prepares the predetermined threshold value which is offset from a vehicular body velocity by an offset quantity, the predetermined start threshold value being modified during the execution of the back-up control in a manner that the offset quantity is modified to a smaller value than that when the controller executes the braking force distribution control function with all of the vehicular road wheel velocity sensors operated normally.

3. A vehicular brake controlling apparatus as claimed in claim 2, wherein the controller further comprises a first determinator to determine whether the failed road wheel velocity sensor is placed on either the front road wheel side inner wheel during the turn of the vehicle or the rear road wheel side outer wheel during the turn of the vehicle and sets, during the execution of the back-up control function, the offset quantity which is different according to a result of determination by the first determinator.

4. A vehicular brake controlling apparatus as claimed in claim 3, wherein the controller further includes a second determinator to determine a rate of the turn of the vehicle with a unit of time and the controller, during the execution of the back-up control function, sets the offset quantity which is different depending upon the rate of the turn of the vehicle.

5. A vehicular brake controlling apparatus as claimed in claim 4, wherein the controller sets the offset quantity which is set when the failed road wheel velocity sensor is determined to be placed on either the front road wheel side outer wheel during the turn of the vehicle or the rear road wheel side inner wheel during the turn of the vehicle is smaller than that set when the failed road wheel velocity sensor is determined by the first determinator to be placed on either the front road wheel side inner wheel during the turn of the vehicle or the rear road wheel side outer wheel during the turn of the vehicle.

6. A vehicular brake controlling apparatus as claimed in claim 5, wherein the controller is configured to be enabled to execute the braking force distribution control function to controllably operate the brake unit to suppress the boosting in the braking liquid pressure for the rear road wheels on the basis of the revolution velocity difference when the revolution velocity difference is in excess of the predetermined start threshold value and when a vehicular body acceleration is reduced below an acceleration threshold value and modifies the acceleration threshold value during the execution of the back-up control function.

7. A vehicular brake controlling apparatus as claimed in claim 6, wherein the controller sets the acceleration threshold value to a higher value when the failed road wheel velocity sensor is determined to be placed on either the front road wheel side outer wheel during the turn of the vehicle or the rear road wheel side inner wheel during the turn of the vehicle than that when the failed road wheel velocity sensor is determined to be placed on either the front road wheel side inner wheel during the turn of the vehicle or the rear road wheel side outer wheel during the turn of the vehicle.

8. A vehicular brake controlling apparatus as claimed in claim 7, wherein the controller sets the acceleration threshold value to the higher value when the rate of turn of the vehicle is determined to be higher than a predetermined value of the rate than that when the rate of the turn is determined to be lower than the predetermined value of the rate.

9. A vehicular brake controlling apparatus as claimed in claim 8, wherein the controller includes a third determinator to determine whether any one of the front right and left and rear right and left road wheel velocity sensors has failed and wherein the controller sets the acceleration threshold value F to a first predetermined value X1 (F=X1), sets a coefficient Y to form the predetermined threshold value $\lambda B$ to a second predetermined value Y1 (Y=Y1), derives a vehicular body velocity VIFE as follows: VIFE=Max(VwFR, VwFL)=Vif, wherein VwFR denotes a front right road wheel velocity derived from the front right road wheel velocity sensor placed on the front right road wheel FR, VWFL denotes a front left road wheel velocity derived from the front right road wheel velocity sensor placed on the front left road wheel FL, and Vif denotes a pseudo vehicular body velocity, and sets the predetermined threshold value $\lambda B$ as follows: $\lambda B$=VIFE·Y (=Y1), when the third determinator determines that none of the road wheel velocity sensors has failed.

10. A vehicular brake controlling apparatus as claimed in claim 9, wherein when the third determinator determines that any one of the front right and left and the rear right and left road wheel velocity sensors has failed, the controller calculates a front road wheel velocity difference $\Delta VF$ and a rear road wheel velocity difference $\Delta VR$ as follows: $\Delta VF$=|VwFR−VwFL|; and $\Delta VR$=|VwRR−VwRL|, wherein VwRR denotes the rear right road wheel velocity derived from the rear right road wheel velocity sensor and VwRL denotes the rear left road wheel velocity derived from the rear left road wheel velocity sensor, and calculates acceleration coefficients Xf and Xr required to form the acceleration threshold value F and coefficients Yf and Yr required to form the predetermined start threshold value $\lambda B$ as follows: Xf=f($\Delta VF$), Xr=f($\Delta VR$); and Yf=f($\Delta VF$), Yr=f($\Delta VR$), wherein f denotes a proportional function.

11. A vehicular brake controlling apparatus as claimed in claim 10, wherein when the third determinator determines that any one of the front right and left and the rear right and left road wheel velocity sensors has failed, the first determinator determines whether the failed road wheel velocity sensor is placed on the front road wheel side outer wheel during the turn of the vehicle and wherein when the first determinator determines that the failed road wheel velocity sensor is placed on the front road wheel side outer wheel during the turn of the vehicle, the controller sets the acceleration threshold value F as X2·Xr, wherein X2·Xr denotes a third predetermined value which is larger than the first predetermined value of X1 and the coefficient Y to for the predetermined threshold value $\lambda B$ as Y=Y2·Yr, wherein Y2·Yr denotes a fourth predetermined value which is larger than the second predetermined value of Y1.

12. A vehicular brake controlling apparatus as claimed in claim 11, wherein when the first determinator determines that the failed road wheel velocity sensor is the front right road wheel velocity sensor placed on the front road wheel side outer wheel during the left turn of the vehicle, the controller sets the predetermined start threshold value $\lambda B$ as follows: $\lambda B$=VIFE·Y2·Yr, wherein VIFE≈VwFL, the offset quantity from the value of VIFE being smaller than the offset quantity associated with the first predetermined value Y1.

13. A vehicular brake controlling apparatus as claimed in claim 12, wherein f($\Delta VR$) is the proportional function of the rear road wheel velocity difference $\Delta VR$ set in a manner that as the value of $\Delta VR$ is increase, the offset quantity becomes smaller.

14. A vehicular brake controlling apparatus as claimed in claim 13, wherein the first determinator determines that the failed road wheel velocity sensor is one of the rear right and left road wheel velocity sensors which is placed on the rear road wheel side inner wheel during the turn of the vehicle, the controller sets the acceleration threshold value F as follows: F=X2·Xf and sets the coefficient Y to form the predetermined start threshold value $\lambda B$ as follows: Y=Y2·Yf.

15. A vehicular braking controlling apparatus as claimed in claim 14, wherein when the first determinator determines that the failed road wheel velocity sensor is one of the rear right and left road wheel velocity sensors which is placed on the outer side during the turn of the vehicle, the controller sets the acceleration threshold value F as follows: F=X1 and sets the coefficient Y to form the predetermined start threshold value $\lambda B$ as follows: Y=Y1.

16. A vehicular brake controlling apparatus as claimed in claim 8, wherein when the third determinator determines that none of the front right and left and the rear right and left road wheel velocity sensors has failed, the controller sets the acceleration threshold value F as follows: F=Xc and sets a coefficient Y to form the predetermined threshold value as follows: Y=Yc.

17. A vehicular brake controlling apparatus as claimed in claim 16, wherein when the first determinator determines that the failed road wheel velocity sensor is placed on either the front road wheel side outer wheel during the turn of the vehicle or the rear road wheel side inner wheel during the turn of the vehicle and the second determinator determines that the rate of the turn of the vehicle is in excess of the predetermined value of the rate, the controller sets the acceleration threshold value F as follows: F=Xa and set the coefficient Y to form the predetermined start threshold value $\lambda B$ as follows: Y=Ya.

18. A vehicular brake controlling apparatus as claimed in claim 17, wherein when the second determinator determines that the rate of the turn of the vehicle is below the predetermined value of the rate, the controller sets the acceleration threshold value F as follows: F=Xb and sets the coefficient Y to form the predetermined start threshold value $\lambda B$ as follows: Y=Yb.

19. A vehicular brake controlling apparatus as claimed in claim 18, wherein the first determinator determines that the failed road wheel velocity sensor is placed on either the front road wheel side inner wheel during the turn of the vehicle or the rear road wheel side outer wheel during the turn of the vehicle, the controller sets the acceleration threshold value F as follows: F=Xc and sets the coefficient Y to form the predetermined start threshold value $\lambda B$ as follows: Y=Yc.

20. A vehicular brake controlling apparatus as claimed in claim 19, wherein Xa>Xb>Xc and Ya>Yb>Yc.

* * * * *